Feb. 4, 1930. P. W. PRUTZMAN 1,745,952
DECOLORIZING FATTY SUBSTANCES WITH ADSORBENTS
Filed April 20, 1927
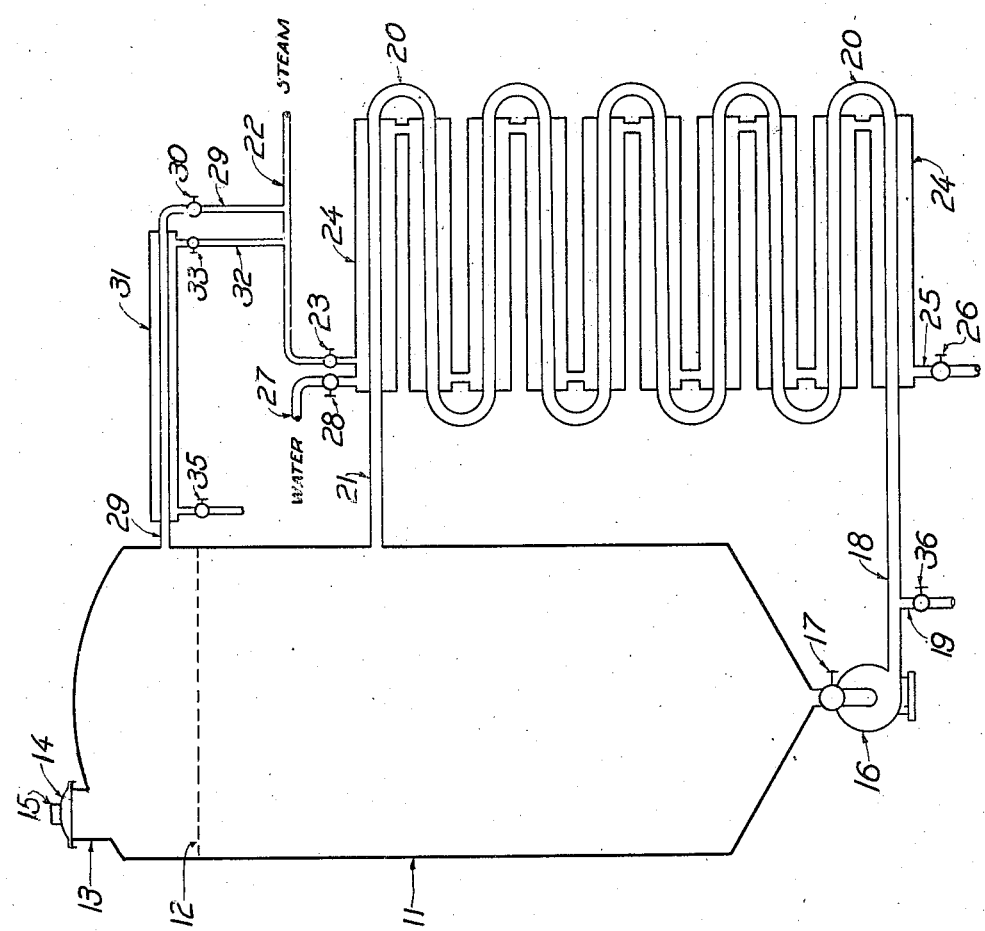

Patented Feb. 4, 1930

1,745,952

UNITED STATES PATENT OFFICE

PAUL W. PRUTZMAN, OF LOS ANGELES, CALIFORNIA

DECOLORIZING FATTY SUBSTANCES WITH ADSORBENTS

Application filed April 20, 1927. Serial No. 185,358.

My invention relates to the partial decolorization of such fatty substances as animal and vegetable oils and fats by the application thereto of finely pulverized materials having the property of selective adsorption for the coloring matter contained in such fat.

My invention relates more particularly to the decolorization of such materials by a certain specific material hereinafter described, which in its physical properties resembles a clay but has a chemical analysis differing from that of any of the known clay forming minerals.

It is old in the art to partly decolorize oils and fats by heating with them a small proportion of some body which has the property of adsorbing and absorbing a portion of the coloring matter contained in the fatty substance. On the mechanical withdrawal of this solid matter, which is finely subdivided prior to use and which is not soluble in the fatty substance, the said fat is left in a paler color than that which it had prior to the treatment. The adsorbent bodies commonly used for this purpose are either charcoal made from bones or from various kinds of vegetable fiber or certain selected clays known in the trade as fuller's earth, which consist essentially of hydrous alumina silicates and which are distinguished from other clays only by their actually exhibiting the property of withdrawing coloring matter when used in this manner.

It is old in the art to apply heat to the mixture of oil and decolorant for the two purposes of accelerating the decolorizing reaction and of increasing its total amount. It is well known that in the conduct of this operation a materially greater decolorizing effect may be obtained and the decolorizing effect may also be brought about much more rapidly by heating the oil or fat in contact with the decolorant to temperatures in the neighborhood of 180°, 200°, or 220° F.

In treating fatty oils and in particular oils and fats which are to be used as food materials (such for instance as salad oils and lard compounds) with the clays known as fuller's earth, it is not considered desirable nor feasible to use temperatures higher than 230° F. at the most, for the reason that at higher temperatures secondary reactions set in by which the separated fat is given an unpleasant taste or odor, whichever it may be, described as "earthy" or "scorched". Furthermore, there is no object in using higher temperatures with any of the above said materials for the reason that raising the temperature above about 220° F. does not produce any further degree of decolorization with a given dose of decolorant.

I have discovered that a certain variety of magnesium silicate (which is fully and completely described in a patent issued August 31, 1926, No. 1,598,254, to Paul W. Prutzman and Arnold D. Bennison) has the property of increasing in decolorizing value up to temperatures much higher than those customarily used or possible to use where fuller's earth is used as the decolorant. This particular variety of magnesium silicate has the analysis when in a pure condition, approximately as follows:

| | Per cent |
|---|---|
| Silica ($SiO_2$) | 60 to 65 |
| Magnesium (MgO) | 27 to 32 |
| Water, combined | 4 to 12 |

The exact mineralogical classification of this mineral has not been determined, though the analysis corresponds to the formula $H_4Mg_2Si_3O_{10}$ or $2H_2O2MgO3SiO_2$. This is the formula for the mineral sepiolite or meerschaum and it is altogether probable that this material is actually sepiolite, though its behaviour with acids would indicate a classification as a variety of talc, and it is possible that it is a mineral intermediate between these two known varieties of the serpentine division. The mineral may be readily distinguished from clay by the fact that it is completely immune to diffusion in or peptization by water. On drying a fragment of the mineral and immersing it in water the expansion due to wetting will cause it to break into angular fragments, and by repeated wetting and drying these fragments may be reduced to a relatively small size, but the fragments when wet retain practically their original hardness and do not display the greasy or slimy feeling which is characteristic of wetted clays. The only deposit of this material discovered to the present time is situated in Nye County, Nevada, about ten miles in a generally northerly direction from the railroad station of Death Valley Junction, and I here describe as accurately as may be the material produced from this deposit, which is well known in the said locality.

In the decolorization of oils which are to be used for the manufacture of soap or for similar purposes where a slight depreciation of the odor is not a matter of moment, no precautions are required in heating the mixture of oil and silicate except to refrain from any avoidable local overheating. The mixture may be heated in a steam jacketed kettle or by means of steam pipes, if a reasonable speed of circulation of the mixture over such pipes is maintained, or even a direct fired kettle provided that such kettle be fired gently and with due regard to the nature of the material under treatment. Where such oils as cotton seed or cocoanut oil, which are to be used as edible oils, are being treated, care should be taken to entirely avoid overheating of any part of the mass, by keeping it in rapid circulation over whatever type of heating surface is used. It is also preferable to use mechanical agitation rather than an air blast for keeping the mixture in motion, to avoid the oxidizing effect of the air blast at the high temperature used. In such cases it is also desirable to enclose the top of the kettle, leaving an opening for the escape of any excess quantity of steam but making the enclosure sufficiently complete to retain on top of the oil mass a blanket of steam, which will be generated by the evaporation of the water always contained in the silicate.

Bearing these precautions in mind the operation is a very simple one and may be described in a few words. The silicate in its raw or natural condition is gently dried to such a degree that it may be readily pulverized. It will be difficult to pulverize if it contains more than about 18% by weight of water and its decolorizing properties will be impaired if it is brought to complete dryness or say to less than 2% of water. Between these two limits the quantity of water remaining in the silicate is a matter of no import and may be determined entirely by a consideration of shipping, grinding and drying costs.

Having been sufficiently dried the silicate is ground to a very fine powder. Preferably this powder should contain about 95% of material fine enough to pass through a 200 mesh screen, but this specification is only to obtain the highest unit decolorizing efficiency. Where for any reason the filtration of spent decolorant from the oil becomes difficult a coarser powder may be used with an increase in filtering rate and a corresponding decrease in decolorizing value.

The oil or fat is placed in a vessel equipped with a heating means and with means for maintaining the mixture in circulation and for maintaining the silicate powder in suspension. The oil or fat should first be heated to a temperature sufficiently high to render it completely liquid, after which the entire dose of silicate may be added at once, or, and this is usually preferable, the charge of fat may be raised to a temperature approximating 230° F. and the pulverized silicate fed into it at such rate as to maintain a smooth and even disengagement of steam without frothing or foaming. The mixture is then kept in circulation while the temperature is raised to the desired point, which may be 300° F., 350° F. or even higher if further decoloration is produced at such higher temperatures. The agitation should be maintained during the entire period of heating and while the mixture is being withdrawn from the heating vessel. There is usually no object in maintaining the maximum temperature for any appreciable time after it is once reached, but it is very desirable that the mixture should be withdrawn from the heating vessel through a cooling coil or other suitable means, for reducing its temperature to approximately 230° F. before it is passed to the filter press or other mechanical means for separating the spent decolorant from the purified oil. This precaution, however, may be neglected if the taste or odor of the oil is not a consideration.

In the apparatus shown in the attached drawing, Fig. 1, the principles of my invention may be put into practice. In this figure, 11 indicates the shell of an agitator or mixer having a conical bottom and a rounded substantially closed top but which may be of any preferred shape. This mixer should be filled to any preferred liquid level, as indicated at 12, through the manhole 13. This manhole is surmounted by a loosely fitting cap 14, of light sheet metal, to which is attached the bale 15. This cover should not be tight enough to retain any pressure whatever but should be a fairly close fit, so as to prevent outside air from blowing into and out of the tank through the manhole.

At the bottom of the mixer or adjacent thereto is placed the centrifugal pump 16, driven from a source of power not shown and controlled by a valve 17. This pump discharges through a line 18, in the course of which is placed a branch line 19 controlled by a valve 36 through which the contents of the system may be drained through a filter press or elsewhere as convenient.

The line 18 discharges into a combined heater and cooler as shown, or if preferred, into separate heating and cooling means. In the design illustrated the oil, pumped from the bottom of the mixer 11 and containing such magnesium silicate as has settled to the bottom of the mixer, is discharged through the pipe 21 back into the mixer 11. By this means a strong circulation of the material may be maintained without the application of air or other gas for agitation.

If the stock to be treated is a solid it may be melted before being placed in the mixer or, if preferred, it may be fed into the mixer in lumps and melted therein by means of a steam coil or a steam jacket not shown. It is more convenient to melt the material in a separate vessel and flow or pump it to the mixer. The magnesium silicate may be added through manhole 13, at any preferred time after the contents of the mixer become liquid.

The coil 20 shown may be used for alternately raising and lowering the temperature. When used as a heating means, steam is admitted from any convenient source through the pipe 22 controlled by valve 23 into the jacket 24—24. In these jackets it may be maintained at boiler pressure, condensed water being withdrawn through the pipe 25 controlled by the valve 26. By this means the oil in the mixer may be raised to the temperature of the steam used by circulating for a sufficient time through the coils 20, without coming into contact with the air.

Where the coil is used for cooling the oil after the treatment is completed, cold water may be admitted through the pipe 27, controlled by valve 28, and allowed to escape at the bottom through line 25, controlled by the valve 26. The pump 16 being operated while the water is flowing, the temperature of the contents of the mixer 11 will be rapidly reduced to any point desired.

When the temperature of the oil passes 212° F. steam will begin to be evolved from the clay and will displace the air from above the oil, said air and any excess steam escaping through the filling manhole 13, under the cap 14.

In case both the clay and the oil should be so dry as not to furnish sufficient steam to displace the air above the oil, further small quantities of steam may be admitted above the oil through the branch steam pipe 29, controlled by the valve 30. To prevent any possibility of condensed water being carried into the hot oil, it is desirable to reheat the expanded steam by passing it through the steam pressure jacket 31. This jacket is supplied with steam through the branch line 32, controlled by valve 33, which should be wide open while the heater 31 is in use, condensed water being withdrawn through the drain pipe 34 controlled by the valve 35. This valve being opened only to such an extent as to allow condensed water to escape, the small supply of steam required to blanket the oil in mixer 11 may be introduced in a perfectly dry condition.

By thus substantially displacing the air by means of steam evolved from the water-containing clay in contact with the hot oil, and by the use of a substantially closed vessel, as indicated at 11 in Fig. 1, it is possible to maintain the oil substantially out of contact with air during that portion of the treatment when its temperature is above 230° F. By avoiding such contact with air, oxidation is minimized or entirely avoided and the color, odor and taste of the finished product are in many or most cases materially improved.

It will be obvious that a fire heated coil or a coil heated by any other means and devoted exclusively to heating may be substituted for the double purpose coil shown in the drawing. In this case, however, a coil of any preferred type should be provided for cooling the oil by means of cold water. In any case circulation of the oil through the heating or cooling means should be continuous while either heating or cooling are under way, and the contents of the mixer should not be withdrawn through the pipe 19 until the temperature of the entire system has come to a balance.

It is impossible to specify any particular quantity of the silicate to be used in any individual case inasmuch as the dose varies with the decolorizing value of the silicate (which is itself not a constant) with the amount of coloring matter in the oil (which varies over a wide range) and with the color specified for the finished oil (which varies with treating requirements and with the use to which the oil is to be put). Nor is it possible to specify the temperature most desirable to attain inasmuch as this varies with the kind of oil being treated, with its purity, and with the use to which it is to be put. The operator should, in advance of an actual treatment, determine by small scale experiment the highest temperature which can be applied to the particular oil being treated without depreciating the qualities (such as taste and odor) which he may desire to retain in the finished oil, and having determined that temperature should find by further experiment the quantity of the silicate which is required to produce the degree of decolorization which his specification requires. Similar experiments are required with other materials and other processes for a predetermination of temperature and dosage, because of the indefinitely variable nature of the materials and of the requirements, and are not peculiar to the application of my invention.

In the attached claims, where I refer to "magnesium silicate" it will be understood that I do not claim magnesium silicates in general, as such term includes many substances entirely unsuited to this use, but that I refer solely to the particular variety of magnesium silicate hereinabove described and which has, so far as I know, not been otherwise named.

In the attached claims, where I make use of the term "fatty oils" I would be understood as meaning to include in such term the so-called fatty acids (as for instance the oleic acid group) the glycerids of such fatty acids (as for instance the olein group) and the natural oils and fats of animal and vegetable origin, liquid and solid, which consist substantially of such fatty acid glycerids.

I claim as my invention:

1. The method of partly decolorizing fatty oils which comprises: heating said oils to a temperature approximating 230° F. and adding to and intermixing with said oils powdered magnesium silicate, substantially as described, at such rate as to avoid excessive frothing; further heating the mixture to a temperature, not substantially less than 250° F., at which a material further decolorizing action takes place; maintaining the mixture in agitation by mechanical means and finally separating the spent silicate from the oil by mechanical means.

2. A method as in claim 1 in which the mixture is heated substantially out of contact with the air and maintained out of such contact so long as the temperature is substantially above 230° F.

3. A method as in claim 1 in which the mixture after heating is artificially cooled to a temperature not substantially above 230° F. prior to the said removal of the spent silicate from the decolorized oil.

In witness that I claim the foregoing I have hereunto subscribed my name this 11th day of April, 1927.

PAUL W. PRUTZMAN.